United States Patent [19]

Fagerburg

[11] 4,180,528
[45] Dec. 25, 1979

[54] BLOCK COPOLYMER COMPOSED OF AN ADDITION POLYMER AND A LINEAR SATURATED POLYESTER

[75] Inventor: David R. Fagerburg, Kingsport, Tenn.

[73] Assignee: Eastman Kodak Company, Rochester, N.Y.

[21] Appl. No.: 919,208

[22] Filed: Jun. 26, 1978

[51] Int. Cl.² .................. C08G 81/02; C08L 67/00
[52] U.S. Cl. .................................................. 525/70
[58] Field of Search ........................................ 260/873

[56] References Cited

U.S. PATENT DOCUMENTS

| | | | |
|---|---|---|---|
| 3,825,620 | 7/1974 | Koleske et al. ...................... | 260/873 |
| 3,843,752 | 10/1974 | Katayama et al. ................... | 260/873 |
| 3,933,940 | 1/1976 | Anderson et al. ................... | 260/873 |
| 4,031,290 | 6/1977 | Anderson et al. .............. | 260/873 X |

OTHER PUBLICATIONS

Floss et al., *Macromolecules*, 9, (1973) 373–374.
Suzuki et al., *J. Poly. Sci., Polymer Letters*, 14 (1976) 675–678.
Laverty et al., *Polym. Prepr. Am. Chem. Soc. Div. Polym. Chem.*, 15 (1974) p. 306.
Franta et al., *Makromol. Chemie*, 177 (1976) 2191–2193.

*Primary Examiner*—Walter C. Danison
*Attorney, Agent, or Firm*—William P. Heath, Jr.; III Reece

[57] ABSTRACT

Disclosed is a A-B-A type block copolymer wherein the A- block is an addition polymer and the -B- block is a linear saturated polyester containing two

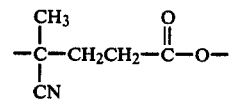

units. This copolymer can be represented as

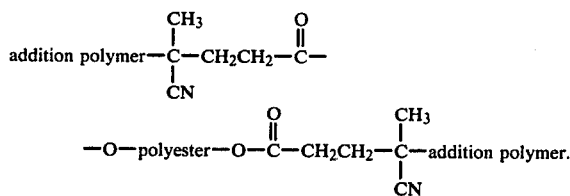

2 Claims, No Drawings

BLOCK COPOLYMER COMPOSED OF AN ADDITION POLYMER AND A LINEAR SATURATED POLYESTER

This invention relates to a polymer that is composed of end blocks which are an addition polymer and a central block which is a linear saturated polyester.

The use of synthetic polymers has increased radically in the last several decades. Originally, synthetic polymers such as polyolefins, polyvinyls, polyesters, polyamides, acrylics and the like were used by themselves and were not combined with other polymers to form blends. In recent years blends of various polymers have been used in increasing volumes for molding and other uses.

Oftentimes a blend of two or more polymers can be easily prepared because the two materials inherently blend together somewhat in the nature of one polymer dissolving in the other. For example, it is known in the art that poly(butylene terephthalate) and poly(ethylene terephthalate) can be readily blended together to prepare a molding plastic. Oftentimes, however, it is not possible to prepare blends of certain polymers because the polymers are incompatible and do not blend together to form a mixture in the nature of a solution of one polymer in the other.

For example, blends of addition polymers and polyesters are often hard to prepare, depending on the particular addition polymer and the particular polyester. For example, if one attempts to prepare a blend of 50 weight parts polypropylene and 50 parts poly(butylene terephthalate) the result is a two-phase mixture composed of one phase of poly(butylene terephthalate) and one phase of polypropylene.

In order to prepare blends of these and similar materials it has been proposed to use a minor amount of a third component to cause the polymers to form a uniform blend. This third component is often called a "compatibilizing agent" because its function is to cause two otherwise incompatible polymers to become compatible and form a uniform blend in the nature of a solution of one polymer in the other.

I have now invented a compatibilizing agent which is a polymer composed of end blocks of polyolefins on a central block of a linear saturated polyester. This polymer can be thought of as a A-B-A type block copolymer wherein the end A- blocks are certain addition polymers and the central -B- block is a specific type of polyester.

Applicant has made a search of the prior art but has not located any art showing an A-B-A type block copolymer wherein the A- block is an addition polymer and the -B- block is a linear saturated polyester. Recent work has been reported in Floss et al *Macromolecules* 9, 373 (1976) wherein olefinic backbones and pendant tetrabutylammonium carboxylate groups were used to initiate polymerization of a lactone, such as pivalolactone. Investigators have also reported using poly(ethylene oxide) glycol reacted with an axo bis(cyanovaleryl chloride) as a means of synthesizing polyolefin-polyether-polyolefin block copolymers. Suzuki et al, *J. Poly. Sci., Polymer Letters*, 14, p. 675 (1976) and Laverty and Gardlund, *Polym. Prepr. Am. Chem. Soc. Div. Polym. Chem.* 15, p. 306 (1974). Work has also been reported on grafting of polyethers onto halogenated polymers such as polyvinyl chloride through use of a silver salt, Franta, Afshar-Taromi and Rempp., *Makromol. Chemie* 177, 2191 (1976). Applicant regards the closest prior art to be the Laverty and Gardlund article.

Broadly, the A-B-A type block copolymer of this invention can be thought of as having A- blocks which are polyethylene, polypropylene, polyacrylonitrile, polymethylmethacrylate, polyvinyl chloride or polystyrene and a -B- block which is a linear saturated polyester containing the structure

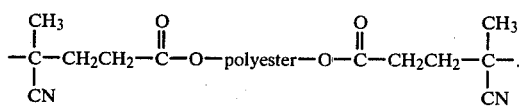

The central portion of the -B- block can be one of several types of linear saturated polyesters.

Applicant's polyester can be precisely defined as an A-B-A type block copolymer having a molecular weight of at least 5,000 wherein the A- block is the monovalent radical remaining after removal of a terminal hydrogen atom from a polymer selected from the group consisting of polyethylene, polypropylene, polyacrylonitrile, polyvinyl chloride, polymethylmethacrylate, and polystyrene, and The -B- block is a divalent radical which is soluble to at least one weight percent in chloroform and has the structure

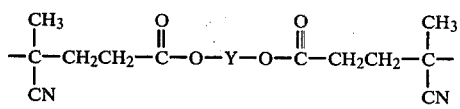

where Y is the divalent radical remaining after removal of the terminal hydroxy groups from a polyester having a molecular weight of at least 1500 selected from the group consisting of a polyester prepared from
  a dicarboxylic acid which can be terephthalic acid, isophthalic acid, 1,4-cyclohexanedicarboxylic acid or adipic acid, and
  a diol which can be ethylene glycol, 1,4-butanediol, 1,4-cyclohexanedimethanol, neopentyl glycol, 2,2,4,4-tetramethyl-1,3-cyclobutanediol, diethylene glycol or 1,6-hexanediol, and
a copolyester of caprolactone and a material selected from the group consisting of terephthalic acid, isophthalic acid, 1,4-cyclohexanedicarboxylic acid, adipic acid, ethylene glcyol, 1,4-butanediol, 1,4-cyclohexanedimethanol, neopentyl glycol, 2,2,4,4-tetramethyl-1,3-cyclobutanediol, diethylene glycol and 1,6-hexanediol and mixtures thereof.

In a preferred embodiment the A- block is polypropylene and the center unit in the -B- block is a copolymer of pivalolactone and diethylene glycol. This polymer can be precisely defined as an A-B-A type block copolymer having a molecular weight of at least 5,000 wherein the A- block is the monovalent radical remaining after removal of the terminal hydrogen atom from polypropylene having a molecular weight of at least 2000, and the -B- block is a divalent radical having the structure

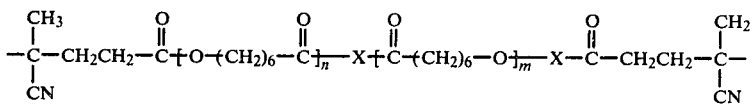

where n+m are at least 17 and X is the divalent radical remaining after removal of the terminal hydrogen atoms from diethylene glycol or ethylene glycol.

The polymer of this invention can be prepared using materials well known in the art.

Broadly the polymer is prepared by first preparing the polyester which contributes the central -Y- portion to the -B- block. Since this polyester must condense with two

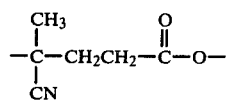

units to form the central -B- block, this polyester must be hydroxy terminated or the functional equivalent thereof.

In one embodiment the polyester which contributes the -Y- radical is a linear saturated polyester prepared from a dicarboxylic acid and a diol. The dicarboxylic acid can be terephthalic acid, isophthalic acid, 1,4-cyclohexanedicarboxylic acid or adipic acid. The diol can be ethylene glycol, 1,4-butanediol, 1,4-cyclohexanedimethanol, neopentyl glycol, 2,2,4,4-tetramethyl-1,3-cyclobutanediol, diethylene glycol or 1,6-hexanediol. These polyesters and methods for their preparation are well known in the art.

In another embodiment the polyester which contributes the -Y- radical is a copolyester of caprolactone and a material selected from the group consisting of terephthalic acid, isophthalic acid, 1,4-cyclohexanedicarboxylic acid, adipic acid, ethylene glycol, 1,4-butanediol, 1,4-cyclohexanedimethanol, neopentyl glycol, 2,2,4,4-tetramethyl-1,3-cyclobutanediol, diethylene glycol and 1,6-hexanediol and mixtures thereof. Since the polyester which contributes the -Y- radical must be hydroxy terminated, only those copolyesters of caprolactone which are hydroxy terminated are within the scope of the invention.

Preferably the polyester which contributes the -Y- radical is a copolyester of caprolactone and either diethylene glycol or ethylene glycol. This polyester has the structure

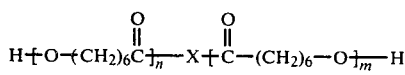

where n+m are at least 17 and X is the divalent radical remaining after removal of the terminal hydrogen atoms from either diethylene glycol or ethylene glycol. These polyesters and methods for their preparation are well known in the art.

In order to proceed with the next step of the reaction the polyester which contributes the central -Y- portion of the -B- block must be water dry. Typically, the linear saturated polyester is refluxed in an organic solvent, such as toluene, in the presence of an organic base such as pyridene, until no further water is distilled off.

Next, the hydroxy terminated polyester which contributes the -Y- portion to the -B- block is used as a diol and reacted with an acid chloride which is azo bis(cyanovaleryl chloride) having the structure

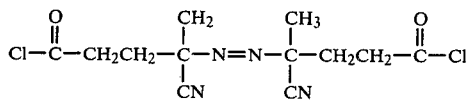

to prepare a linear saturated polyester composed of repeating units containing the polyester which contributes the -Y- radical to the central -B- block and a unit contributed from the azo bis(cyanovaleryl chloride). The repeating unit of this linear saturated polyester has the structure

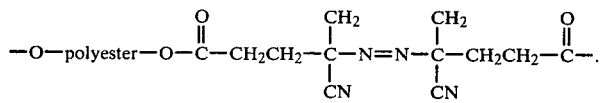

When considered in terms of the chemistry involved in preparing the A-B-A type block copolymer, the structure of the linear saturated polyester can be thought of as containing units corresponding to the structure

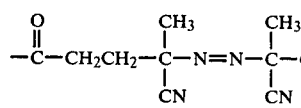 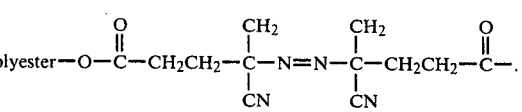

Since the azo bond in the azo bis(cyanovaleryl chloride) will spontaneously decompose upon heating, both the azo bis(cyanovaleryl chloride) and the linear saturated polyester containing the azo bis(cyanovaleryl chloride) must be maintained at less than 40° C.

This polymer is then heated in the presence of an unsaturated monomer, such as propylene, which forms the addition polymer. Upon heating the polymer splits at each azo group to liberate $N_2$ and thereby forms radicals having the structure

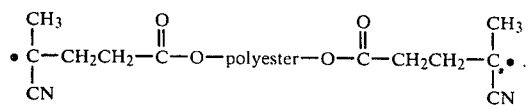

These radicals act as free radical catalysts which seek out and polymerize the monomer which forms the addition polymer and thereby form the polyester of the invention corresponding to the formula

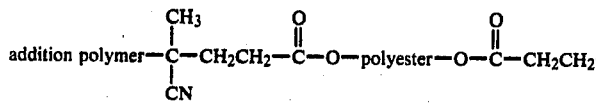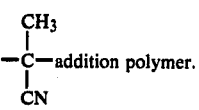

The block copolymers of this invention are useful as compatibilizing agents for the preparation of blends of polyolefin and polyesters. By the term "compatibilizing agent" and terms of similar import, it is meant that the block copolymers of this invention cause unblendable polymers to form a uniform blend. By the term "unblendable polymers" it is meant polymers which, when mixed together, do not form a mixture in the nature of a solution of the two polymers and the two polymers remain in distinctive phases. By the term "uniform blend" it is meant that the unblendable polymers form a mixture in the nature of a solution of one polymer in the other.

The block copolymers of this invention can be used as compatibilizing agents by adding a sufficient quantity of the block copolymer either to the unblendable polymers before they are blended or to a combination of the unblendable polymers. Preferably, pellets of the block copolymer are blended with pellets of the unblendable polymers and the blend extruded. Although the amount of compatibilizing agent can vary widely depending on the kinds and relative amounts of the unblendable polymers, in a typical embodiment where around equal parts of two unblendable polymers are to be blended, the amount of block copolymer can be broadly in the range of 1 to 20 weight percent, preferably 5 to 10 weight percent, based on the total weight of both unblendable polymers.

The following examples are presented to illustrate preparation of the block copolymers of the invention and illustrate the utility of the block copolymers as compatibilizing agents. In these examples, the molecular weight of some of the polymers is expressed as inherent viscosity measured at 25° C. using 0.23 gram of polymer per 100 ml. of a solvent composed of 60 volumes of phenol and 40 volumes of tetrachloroethane.

EXAMPLE 1

In a 250 ml round bottom flask are combined 100 ml. of toluene, 1.0 g. pyridine, and 19.7 g. (0.10 mol.) of a copolymer of caprolactone and diethylene glycol having the formula

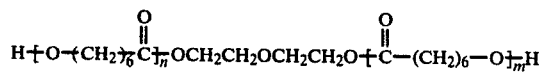

where n plus m is approximately 16. This polymer is commercially available and is sold under the name Niax D560 by Union Carbide Corporation. The hydroxy number of this polymer is 57. The polymer is dried by immersing the flask in a metal bath held at 150° C. The toluene was refluxed via a condenser into a Dean-Stark tube already filled with toluene. The mixture was refluxed for ~20 min. after which time there was no evidence of any further water being distilled over. The solution was cooled in an ice bath and 3.2 g (0.098 mol) of azo bis(cyanovaleryl chloride) added with magnetic stirring. The reaction mixture was allowed to stir under N₂ overnight after which it was filtered by suction. Evaporation of the toluene under a stream of N₂ at ambient temperature produced 21.1 g. (95% yield) of a yellow, flaky material having a molecular weight of 5000. NMR analysis supports the predicted polymer structure which is composed of the repeating units

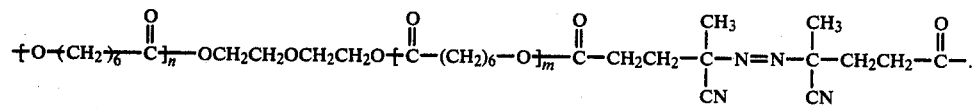

One half gram of this polymer is placed in a flask and dissolved at room temperature in 4.5 g. of methyl methacrylate.

The solution is heated on a steam cone for 25 min. after which time a solid mass forms. The solid mass is cooled and recovered by breaking the flask. The crystal clear polymer has an inherent viscosity of 0.65 and a Tg by DSC of 93° C.

This polymer is useful as a compatibilizing agent to prepare blends of polymethyl methacrylate and poly(butylene terephthalate). 45 Grams of pelletized polymethyl methacrylate having a melt index of 5 and 45 grams of pelletized poly(butylene terephthalate) having an inherent viscosity of 1.00 and 10 grams of the pelletized polymer are blended by tumbling. The pellet blend is extruded at 245° C. to give a melt of translucent appearance rather than an opaque appearance which would be observed if the compatibilizing agent was not used. Injection molded bars of this blend show a decreased tendency to blush and delaminate when bent as compared to bars of a comparable blend without the compatibilizing agent. Elongation to break of the bars molded from the blends is much higher than a similar blend of the poly(butylene terephthalate) and polymethyl methacrylate containing no compatibilizing agent. The higher elongation of the composition of the invention indicates a more homogeneous blend in the nature of a solution of all three polymers together.

EXAMPLE 2

0.5 Gram of the azo-containing polyester of Example 1 is dissolved in 4.5 g. of styrene. The solution is heated on a steam cone for 4 hours to give a hazy, solid mass having an inherent viscosity of 1.09 and a Tg by DSC of 85° C.

This block copolymer is useful as a compatibilizing agent for blends of polystyrene and poly(butylene terephthalate).

EXAMPLE 3

The procedure of Example 1 is used except that propylene is substituted for methyl methacrylate and the resulting polymer is dissolved in 50 ml. of dry toluene. The solution is placed in an autoclave and heated for 10 hours at 100° C. After cooling, the solution is evaporated to give 4.8 g. of a block copolymer. Ten weight parts of the block copolymer are effective in compatibilizing a melt blend of 45 weight parts of polypropylene having a melt index of 15 and 45 weight parts of poly(butylene terephthalate) having an inherent viscosity of 1.00.

The invention has been described in detail with particular reference to preferred embodiments thereof, but it will be understood that variations and modifications can be effected within the spirit and scope of the invention.

I claim:

1. An A-B-A type block copolymer having a molecular weight of at least 5,000 wherein the A- block is the monovalent radical remaining after removal of a terminal hydrogen atom from an addition polymer selected from the group consisting of polyethylene, polypropylene, polyacrylonitrile, polyvinyl chloride, polymethylmethacrylate, and polystyrene, and the -B- block is a divalent radical which is soluble to at least one weight percent in chloroform and has the structure

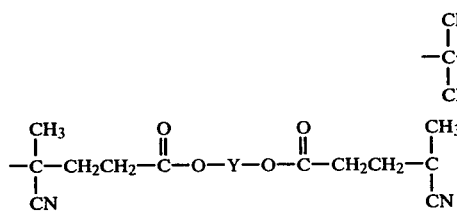

where Y is the divalent radical remaining after removal of the terminal hydroxy groups from a linear saturated polyester having a molecular weight of at least 1500 selected from the group consisting of a polyester prepared from
  a dicarboxylic acid which can be terephthalic acid, isophthalic acid, 1,4-cyclohexanedicarboxylic acid or adipic acid, and
  a diol which can be ethylene glycol, 1,4-butanediol, 1,4-cyclohexanedimethanol, neopentyl glycol, 2,2,4,4-tetramethyl-1,3-cyclobutanediol, diethylene glycol or 1,6-hexanediol, and a copolyester of caprolactone and a material selected from the group consisting of terephthalic acid, isophthalic acid, 1,4-cyclohexanedicarboxylic acid, adipic acid, ethylene glycol, 1,4-butanediol, 1,4-cyclohexanedimethanol, neopentyl glycol, 2,2,4,4-tetramethyl-1,3-cyclobutanediol, diethylene glycol and 1,6-hexanediol and mixtures thereof.

2. An A-B-A type block copolymer having a molecular weight of at least 5,000 wherein the A- block is the monovalent radical remaining after removal of the terminal hydrogen atom from polypropylene having a molecular weight of at least 2000, and the -B- block is a divalent radical having the structure

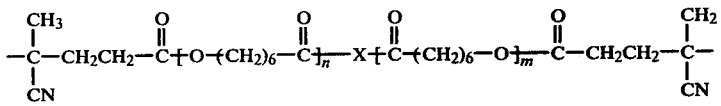

where n+m are at least 17 and X is the divalent radical remaining after removal of the terminal hydrogen atoms from diethylene glycol or ethylene glycol.

* * * * *